United States Patent [19]

Olsen et al.

[11] 3,887,915

[45] June 3, 1975

[54] ARRANGEMENT FOR DETECTING DIELECTRIC BREAKDOWNS IN METAL-CLAD HIGH-VOLTAGE SWITCHING AND TRANSMISSION INSTALLATIONS

[75] Inventors: Willi Olsen; Manfred Lieske; Wolfgang Ehmann; Gerhard Perst, all of Berlin, Germany

[73] Assignee: Siemens Aktiengesellschaft, Munich, Germany

[22] Filed: Mar. 18, 1974

[21] Appl. No.: 452,261

[30] Foreign Application Priority Data
Mar. 23, 1973   Germany............................ 2315323

[52] U.S. Cl................ 340/415; 307/141; 317/27 R
[51] Int. Cl. ........................................... H02b 13/02
[58] Field of Search ....... 340/256, 248 A, 415, 255; 317/27 R, 36 TD; 302/116, 141

[56] References Cited
UNITED STATES PATENTS

| | | |
|---|---|---|
| 2,679,037 | 5/1954 | O'Keefe.......................... 340/415 X |
| 2,736,009 | 2/1956 | Barnickel........................... 340/415 |
| 2,900,628 | 8/1959 | Fegely et al. ....................... 340/415 |
| 3,535,591 | 10/1970 | Holmquest................. 317/36 TD X |
| 3,599,044 | 8/1971 | Takemura et al............ 317/27 R X |

*Primary Examiner*—John W. Caldwell
*Assistant Examiner*—Daniel Myer
*Attorney, Agent, or Firm*—Kenyon & Kenyon Reilly Carr & Chapin

[57] ABSTRACT

An arrangement for detecting dielectric breakdowns in high-voltage installations with several gastight, compartmentalized sections includes at least one stationary measuring device at the section wherein a fault can occur. The measuring device is connected with an evaluation control arrangement for operation in combination therewith. The measuring device is an electroacoustic transducer which picks up the sound waves generated at the breakdown point and is connected with the control arrangement through frequency and amplitude dependent filters.

9 Claims, 6 Drawing Figures

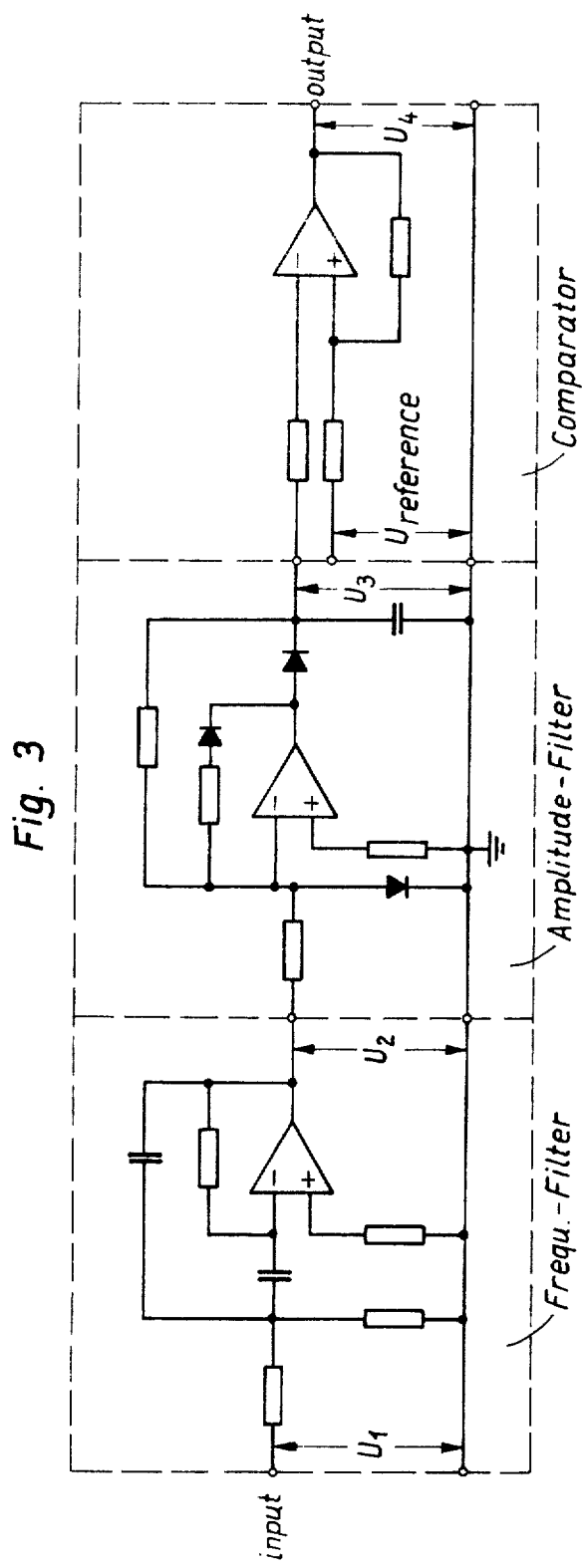
Fig. 3
Fig. 5
corresponding IEC 117-13
Fig. 6
corresponding IEC 117-13

3,887,915

ARRANGEMENT FOR DETECTING DIELECTRIC BREAKDOWNS IN METAL-CLAD HIGH-VOLTAGE SWITCHING AND TRANSMISSION INSTALLATIONS

BACKGROUND OF THE INVENTION

The invention relates to an arrangement for detecting dielectric breakdowns in metal-clad high-voltage switching installations with several gastight, compartmentalized component sections wherein the faulty section is detected by at least one stationary measuring device which, in turn, is connected with an evaluation, signaling or control arrangement.

Deutsche Offenlegungsschrift 1,665,637 discloses a compressed gas-insulated high-voltage switching installation wherein a monitoring device causes the system to shut down at pressures higher than the operating pressure. In this manner, the possibility is to be provided without cost to eliminate arcing to ground. In the known configuration, the arc is therefore not detected directly, but is instead detected by the pressure increase caused by the arc in heating the gas. If the known installation is developed for compartmentalization into several gas compartments, a separate monitoring device should be provided for each gas compartment.

SUMMARY OF THE INVENTION

It is an object of the invention to provide an arrangement for detecting dielectric breakdowns in high-voltage installations of the above-mentioned type. It is another object of the invention to provide such an arrangement which requires little or no effort, and particularly, which requires no intervention in already existing equipment.

These objects are realized in the arrangement according to the invention by providing detection means in the form of a measuring device such as an electroacoustic transducer which detects the sound waves generated at the point of the breakdown and transmitted by the encapsulation. The electroacoustic transducer is connected with the evaluation control arrangement through a frequency and amplitude dependent filter as well as a time delay device.

The electroacoustic transducer which detects the sound waves and is preferably a contact microphone and is attached at the outside of the encapsulation so that it can deliver an electrical signal when dielectric breakdowns occur. This signal is fed to a filter dependent upon frequency and amplitude in order to eliminate interfering signals and is transmitted from there to a time delay device which serves to suppress signals that are not caused by dielectric breakdowns.

In high-voltage switching installations with a plurality of differently constructed, gastight compartmentalized component sections, it is advantageous to arrange one electroacoustic transducer in the area of each component section. For a fixation of the measurement result, there is provided in one particularly advantageous embodiment a switching arrangement, which detects and evaluates the propagation time differences of all the signals delivered by the electroacoustic transducers. To fit the detection arrangement according to the invention to high-voltage switching installations, in which different interference signals might influence the measurement result, the basic frequency and/or attenuation of the filter are made adjustable.

In one preferred embodiment of the arrangement according to the invention, the evaluation control arrangement contains a memory which is directly connected with the time delay device and whose output is connected with one input of an AND gate. The second input of this AND-Gate is fed from a network protection or ground detection device monitoring the high-voltage switching installation.

Although the invention is illustrated and described herein as arrangement for detecting dielectric breakdowns in metal-clad high-voltage switching and transmission installations, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWING

FIG. 3 is a schematic diagram showing a filter and amplifier of the detection device of the detection arrangement of the invention.

FIG. 5 is a schematic diagram showing a timing delay device which can be utilized in the detection arrangement of the invention.

FIG. 6 shows a memory for suppressing interference signals to which the detection arrangement of the invention can be subjected.

DESCRIPTION OF THE PREFERRED EMBODIMENTS OF THE INVENTION

Figure 1:
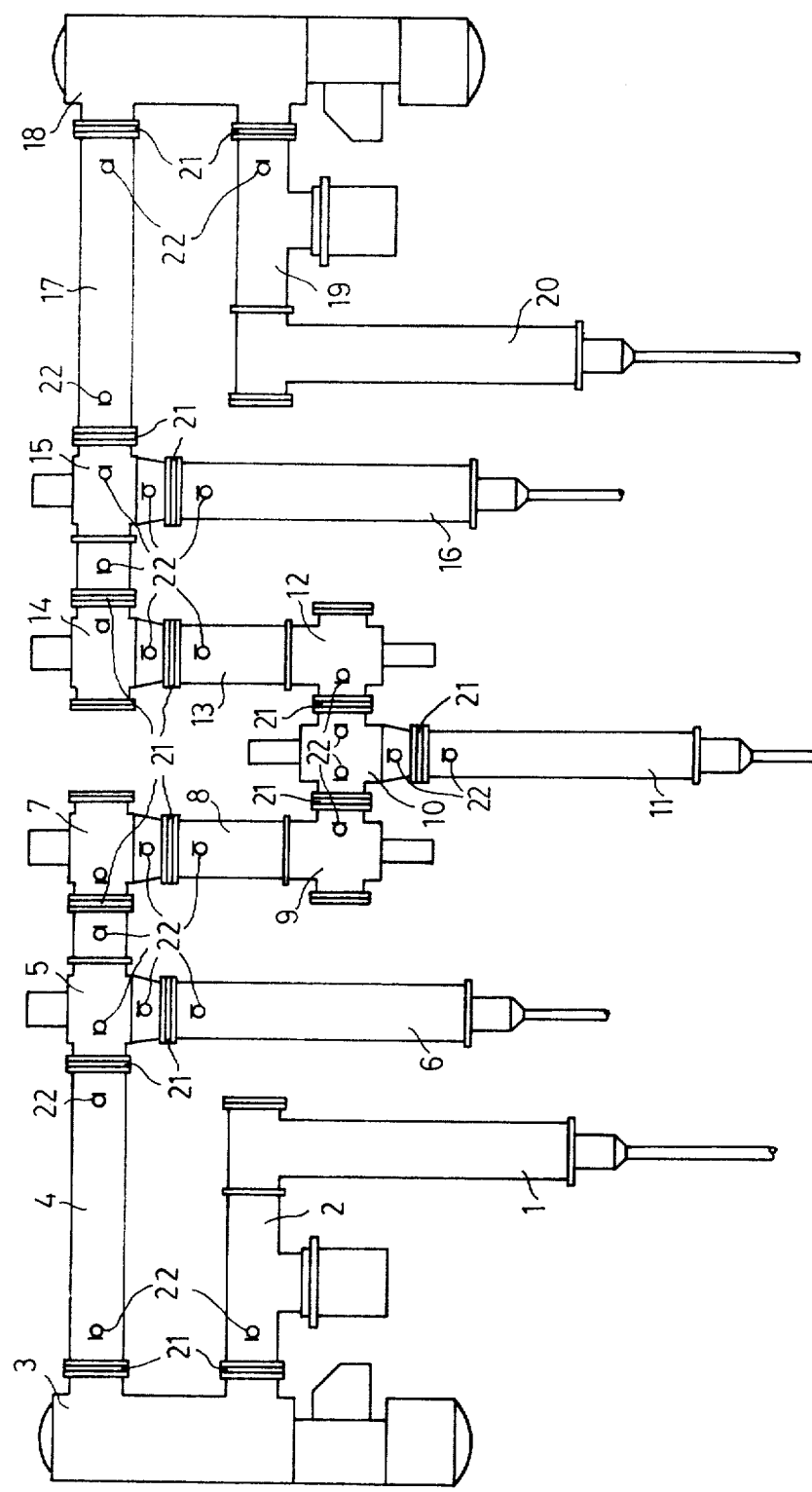
FIG. 1 is a schematic diagram showing a high-voltage installation equipped with the detection arrangement according to the invention.

The metal-clad high-voltage switching installation of FIG. 1 includes an outgoing cable 1, a line disconnect switch 2 connected therewith which leads to a power circuit breaker 3, and a tubular conductor configured as a coupling section 4. The coupling section 4 is connected with the power circuit breaker 3 and leads to a load disconnect switch 5. The load disconnect switch 5 is connected on one side with a transformer branch circuit 6 and on the other side with a further load disconnect switch 7 which acts as a series disconnect switch and in turn is connected through a grounding device 8 with a disconnect switch 9 and through the latter, with a load disconnect switch 10.

The load disconnect switch 10 is connected on the one hand with a transformer branch 11 and on the other hand with a disconnect switch 12, which is connected in turn via a grounding device 13, a load disconnect switch 14 acting as a series disconnect switch and a load disconnect switch 15 with a further outgoing transformer circuit 16 on the one hand, and with a tubular conductor 17 constructed as a coupling section, on the other hand. The tubular conductor 17 is connected with a power circuit breaker 18, whose other connection is connected with an outgoing cable 20 through a line disconnect switch 19.

At the locations 21 are located bulkheads which subdivide the high-voltage switching installation into several sections which are separated from each other in a gastight and arc-resistant manner. In order to be able to identify the faulty section in the metal-clad high-voltage switching installation after a dielectric breakdown has occurred, each fault-prone section is provided with at least one electroacoustic transducer as a measuring device which is arranged in the area of each bulkhead location 21. The electroacoustic transducers are designated with reference numeral 22. An arc forming as a result of a dielectric breakdown makes a characteristic noise having a main component of twice the line frequency. At the point of the breakdown, sound waves are produced accordingly, which are transmitted by the encapsulation and get to the measuring devices 22 which are connected to the encapsulation. That measuring device 22 which detects the characteristic sound wave first, furnishes the criterion for the detection of a dielectric breakdown in the high-voltage switching installation.

Figure 2:
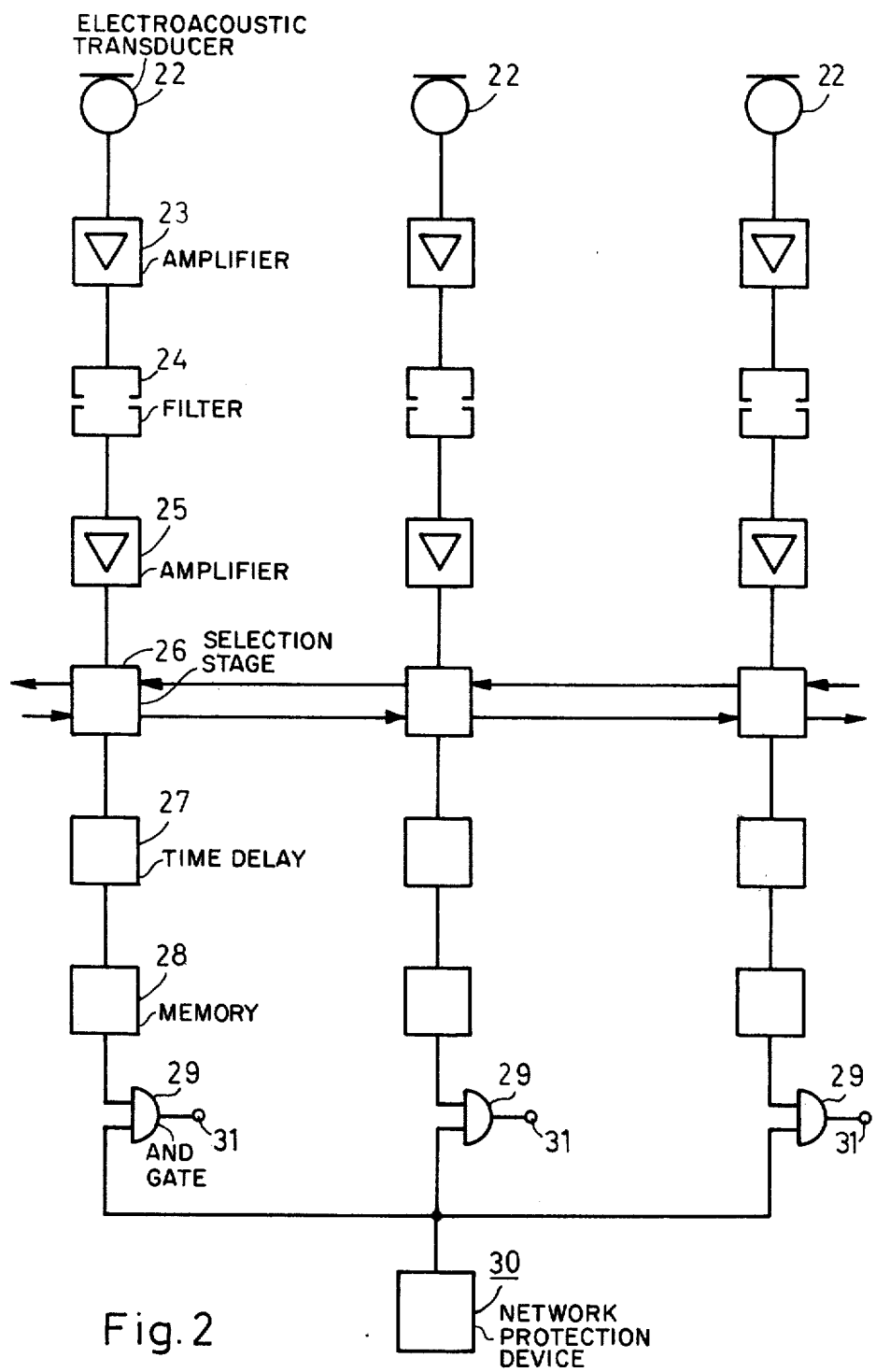
FIG. 2 is a schematic block diagram of the detection arrangement of the invention applied for detecting a dielectric breakdown in three different component sections of a high-voltage switching installation, for example, of the type shown in FIG. 1.
Figure 4:
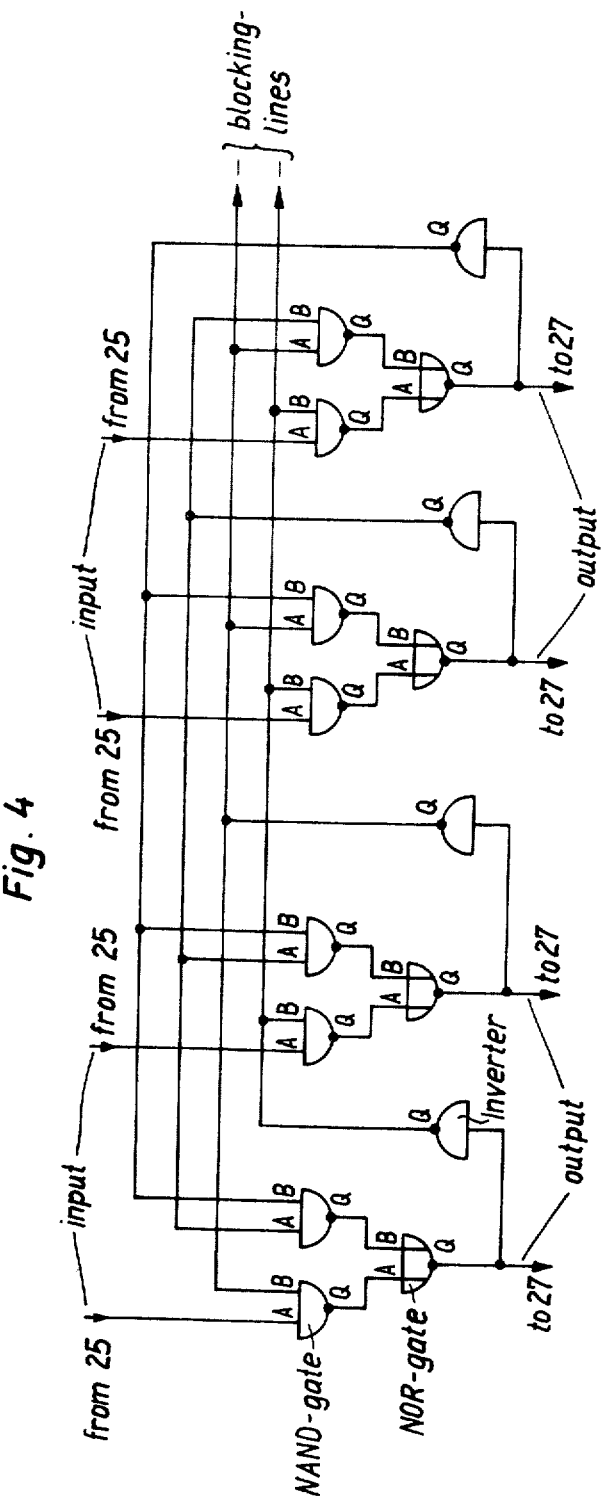
FIG. 4 illustrates the switching device for identifying the electroacoustic transducer corresponding to a faulted component section according to another embodiment of the invention.

In the block diagram of FIG. 2 for simplicity, only three electroacoustic transducers 22 followed by identical cascade circuits are shown. The electroacoustic transducer 22 feeds an amplifier 23, whose output is connected to a filter 24 that can be tuned to twice the line frequency, for example, to 100 Hz. The frequency of the filter 24 may be adjustable with suitable means, for example, as shown in FIG. 3. The filter 24 is configured so that only those signal components of the electroacoustic transducer 22 appear at its output which have the characteristic frequency of 100 Hz. The output signal of the filter 24 is fed to an amplifier 25 with adjustable amplitude also shown in detail in FIG. 3. The output signal of the amplifier 25 is fed to a selection stage 26. The selection stage 26, for example, is configured such that when the first signal of a microphone appears, the channels of all other microphones 22 are blocked. In this manner, one obtains from the selection stage 26 an unequivocal statement as to the location of the acoustic event detected in the high-voltage switching installation. The logic circuit of the selection stage 26 can be configured, for example, as shown in FIG. 4.

By means of the filter 24, all interference signals are eliminated which do not have the frequency characteristic of an arc due to a fault. The amplifier 25, furthermore, amplifies only those signals which have a minimum amplitude, so that interfering signals below a certain level are not evaluated.

In a high-voltage switching installation of the kind shown in FIG. 1, an arc results when the power circuit breakers 3 or 18 are switched under load; this action generates noise that can resemble that of a fault arc. For this reason it is necessary in such high-voltage switching installations to provide an additional arrangement which prevents the detection of a breaking arc of the power circuit breaker.

In FIG. 2, a time delay arrangement 27 is therefore connected to the output of the selection stage 26 which is configured so that it passes signals only if the occurring signal is longer than the quenching time of the power circuit breaker. This assures that the breaking arc of a power circuit breaker is not evaluated by the detection arrangement according to the invention. The time delay arrangement can be configured, for example, as shown in FIG. 5.

In high-voltage switching installations, in which other interfering signals can be expected, for example, interference signals of large amplitude oscillating at twice the line frequency with a duration that exceeds the time set at the time delay device 27, it may be advantageous to connect to the time delay 27, for the purpose of suppressing such interference signals, a memory 28, which stores at its output a signal passed by the time delay device 27; this last-mentioned signal is stored for an extended, pre-settable period of time. The memory is shown in greater detail in FIG. 6. The output of the memory 28 is connected with one input of an AND gate 29. The second input of the AND gate is fed from a device 30, which may be either a network protection device for tripping a power circuit breaker or a ground detection device. In this manner, it is assured that the AND gate 29 delivers at its output 31 a signal if, and only if, an electric breakdown, which has led to the tripping of a power circuit breaker and thereby to the separation of the faulty parts of the high-voltage switching installation, has occurred.

The arrangement for the detection of dielectric breakdown in metal-clad high-voltage switching installations, if constructed with identically configured component sections, is provided advantageously with only one measuring device per component section, this one measuring device being arranged symmetrically and centrally. Thereby, high-voltage transmission lines can be monitored for dielectric breakdowns without great expense by telemetering, if desired.

What is claimed is:

1. An arrangement for detecting dielectric breakdowns in a metal-encapsulated, high-voltage installation such as an equipment suitable for switching and transmitting high-voltages made up of a plurality of component sections sealed gastight one with respect to the other wherein breakers open and close causing an interrupting arc of known duration to be drawn during a breaker opening operation and wherein a dielectric breakdown is accompanied by a fault arc having noise frequency approximately the same as that of the interrupting arc, the arrangement operating in combination with a network protection device for issuing a signal in response to the presence of a fault in the installation, the arrangement comprising: electroacoustic transducer means disposed at a component section for detecting the sound waves generated by the fault arc and transmitted by the encapsulation; filter means for blocking signals from said transducer means having a frequency other than that of the fault arc; amplitude means for passing only said signals from said transducer means having a minimum amplitude whereby signals below said amplitude are not transmitted; time delay means for passing said signals from said transducer means having a duration greater than the duration of the interrupting arc; and, evaluation control means for issuing a signal indicative of a fault in response to the presence simultaneously of a signal from said time delay means and a signal from the network protection device.

2. The arrangement of claim 1 wherein the component sections are sealed one with respect to the other by respective bulkheads, and wherein said electroacoustic transducer means, said filter means, said amplitude means and said time delay means are serially connected to conjointly define a breakdown detection device, said arrangement comprising a plurality of said detection devices corresponding to respective ones of the component sections, said transducer means of each of said detection devices being arranged at the bulkhead corresponding to each component section.

3. The arrangement of claim 2, each of said transducer means being a contact microphone.

4. The arrangement of claim 2, circuit means for receiving the output signals of each of said transducer means for identifying the transducer means issuing an output signal indicative of a dielectric breakdown in the component section corresponding thereto.

5. The arrangement of claim 4, said circuit means including means for detecting the output signal of a transducer means corresponding to a component section wherein a dielectric breakdown has occurred and for blocking the outputs of the remaining ones of said detection devices whereby a definitive statement is obtained for identifying the faulted component section.

6. The arrangement of claim 1, said filter means including means for adjusting the basic frequency thereof, and said amplitude means including means for adjusting the attenuation thereof.

7. The arrangement of claim 1, said filter means including means for adjusting the basic frequency thereof.

8. The arrangement of claim 1, said amplitude means including means for adjusting the attenuation thereof.

9. The arrangement of claim 2 wherein each of said detection devices can be subjected to interference signals having a duration greater than said duration of said time delay means and having a frequency approximately the same as the fault arc, said evaluation and control means comprising an AND-Gate having a first input for receiving the output of the network protection device, said AND-Gate also having a second input; and, a memory having an output connected directly to said second input of said AND-Gate, said memory having an input connected directly to the output of said time delay means and being configured for storing said interference signals a predetermined time whereby said interference signals are not transmittted to said second input of said AND-Gate.

* * * * *